United States Patent
Fricke et al.

(10) Patent No.: US 9,260,580 B2
(45) Date of Patent: Feb. 16, 2016

(54) PROCESS FOR PRODUCING POROUS MATERIALS BASED ON POLYUREA

(75) Inventors: Marc Fricke, Osnabrück (DE); Mark Elbing, Syke (DE)

(73) Assignee: BASF SE, Ludwigshafen (DE)

( * ) Notice: Subject to any disclaimer, the term of this patent is extended or adjusted under 35 U.S.C. 154(b) by 656 days.

(21) Appl. No.: 13/169,245

(22) Filed: Jun. 27, 2011

(65) Prior Publication Data

US 2011/0319508 A1 Dec. 29, 2011

Related U.S. Application Data

(60) Provisional application No. 61/358,954, filed on Jun. 28, 2010.

(51) Int. Cl.
*C08J 9/28* (2006.01)
*C08G 18/32* (2006.01)
*C08G 101/00* (2006.01)

(52) U.S. Cl.
CPC ............... *C08J 9/28* (2013.01); *C08G 18/3243* (2013.01); *C08G 2101/0083* (2013.01); *C08G 2101/0091* (2013.01); *C08J 2201/05* (2013.01); *C08J 2201/0502* (2013.01); *C08J 2203/10* (2013.01); *C08J 2205/024* (2013.01); *C08J 2375/04* (2013.01)

(58) Field of Classification Search
CPC .................. C08G 18/3243; C08G 2101/0083; C08G 2101/0091; C08J 2205/024; C08J 2375/04; C08J 9/28; C08J 2201/05; C08J 2201/0502; C08J 2203/10

USPC ..................... 521/99, 130, 131, 163
See application file for complete search history.

(56) References Cited

U.S. PATENT DOCUMENTS

| | | | | |
|---|---|---|---|---|
| 6,063,824 A | * | 5/2000 | Krech et al. | ................. 521/121 |
| 2006/0046622 A1 | * | 3/2006 | Prasad | ............................ 451/41 |
| 2010/0148109 A1 | | 6/2010 | Schadler et al. | |

FOREIGN PATENT DOCUMENTS

| | | | |
|---|---|---|---|
| EP | 0026915 | * | 4/1981 |
| GB | 1 412 818 | | 11/1975 |
| WO | WO8906251 | * | 7/1989 |
| WO | WO 95/02009 | | 1/1995 |
| WO | WO9502009 | * | 1/1995 |
| WO | WO 00/24799 | | 5/2000 |
| WO | WO 2008/138978 | | 11/2008 |
| WO | WO 2009/027310 | | 3/2009 |
| WO | WO 2010/105985 | | 9/2010 |
| WO | WO 2011/000771 | | 1/2011 |
| WO | WO 2011/018371 | | 2/2011 |
| WO | WO 2011/045306 | | 4/2011 |
| WO | WO 2011/069959 | | 6/2011 |

* cited by examiner

*Primary Examiner* — John Cooney
(74) *Attorney, Agent, or Firm* — Drinker Biddle & Reath LLP

(57) ABSTRACT

The present invention relates to a process for producing porous materials, which comprises reaction of at least one polyfunctional isocyanate with an amine component comprising at least one polyfunctional substituted aromatic amine and also water in the presence of a solvent.
The invention further relates to the porous materials which can be obtained in this way and the use of the porous materials as insulation material and in vacuum insulation panels.

17 Claims, No Drawings

PROCESS FOR PRODUCING POROUS MATERIALS BASED ON POLYUREA

CROSS-REFERENCE TO RELATED APPLICATIONS

This Application claims the benefit of U.S. Provisional Application 61/358,954 filed on June 28, 2010, the contents of which are incorporated herein by reference in its entirety.

The present invention relates to a process for producing porous materials, which comprises reaction of at least one polyfunctional isocyanate with an amine component comprising at least one polyfunctional substituted aromatic amine and also water in the presence of a solvent.

The invention further relates to the porous materials which can be obtained in this way and the use of the porous materials as insulation material and in vacuum insulation panels.

BACKGROUND

Porous materials, for example polymer foams, having pores in the size range of a few microns or significantly below and a high porosity of at least 70% are particularly good thermal insulators on the basis of theoretical considerations.

Such porous materials having a small average pore diameter can be, for example, in the form of organic xerogels. In the literature, the term xerogel is not used entirely uniformly. In general, a xerogel is considered to be a porous material which has been produced by a sol-gel process, with the liquid phase having been removed from the gel by drying below the critical temperature and below the critical pressure of the liquid phase ("subcritical conditions"). In contrast, the term aerogels generally refers to gels obtained when the removal of the liquid phase from the gel has been carried out under supercritical conditions.

In the sol-gel process, a sol based on a reactive organic gel precursor is first produced and the sol is then gelled by means of a crosslinking reaction to form a gel. To obtain a porous material, for example a xerogel, from the gel, the liquid has to be removed. This step will hereinafter be referred to as drying in the interests of simplicity.

WO-95/02009 discloses isocyanate-based xerogels which are particularly suitable for applications in the field of vacuum insulation. The publication also discloses a sol-gel-based process for producing the xerogels, in which known, inter alia aromatic, polyisocyanates and an unreactive solvent are used. As further compounds having active hydrogen atoms, use is made of aliphatic or aromatic polyamines or polyols. The examples disclosed in the publication comprise ones in which a polyisocyanate is reacted with diaminodiethyltoluene. The xerogels disclosed generally have average pore sizes in the region of 50 μm. In one example, mention is made of an average pore diameter of 10 μm.

WO-2008/138978 discloses xerogels which comprise from 30 to 90% by weight of at least one polyfunctional isocyanate and from 10 to 70% by weight of at least one polyfunctional aromatic amine and have a volume average pore diameter of not more than 5 microns.

The unpublished EP-A 09178783.8 describes porous materials based on polyfunctional isocyanates and polyfunctional aromatic amines, where the amine component comprises polyfunctional substituted aromatic amines. The porous materials described are produced by reacting isocyanates with the desired amount of amine in a solvent which is inert toward the isocyanates. The formation of urea linkages occurs exclusively by reaction of the isocyanate groups with the amino groups used.

However, the materials properties, in particular the mechanical stability and/or the compressive strength and also the thermal conductivity, of the known porous materials based on polyurea are not satisfactory for all applications. In addition, the formulations on which the materials are based display shrinkage, with reduction of the porosity and an increase in the density, on drying. Furthermore, the gelling time, i.e. the time required for gelling of the starting compounds, is often too long.

A particular problem associated with the formulations based on isocyanates and amines which are known from the prior art are mixing defects. Mixing defects occur as a result of the high reaction rate between isocyanates and amino groups, since the gelling reaction has already proceeded a long way before complete mixing. Mixing defects lead to porous materials having heterogeneous and unsatisfactory materials properties. A concept for reducing the phenomenon of mixing defects is thus generally desirable.

BRIEF SUMMARY

It was therefore an object of the invention to avoid the abovementioned disadvantages. In particular, a porous material which does not have the abovementioned disadvantages, or has them to a reduced extent, should be provided. The porous materials should, compared to the prior art, have improved thermal conductivity in vacuo. In addition, the porous materials should have a low thermal conductivity even at pressures above the vacuum range, in particular in a pressure range from about 1 mbar to about 100 mbar. This is desirable since an increase in pressure occurs over time in vacuum panels. Furthermore, the porous material should at the same time have a high porosity, a low density and a sufficiently high mechanical stability.

Finally, mixing defects and thus the heterogeneities in the structure and the materials properties of the porous materials formed in the reaction of the isocyanates with the amines should be avoided.

We have accordingly found the process of the invention and the porous materials which can be obtained in this way.

The process of the invention for producing a porous material comprises reacting the following components (a1), (a2) and (a3):

(a1) at least one polyfunctional isocyanate,
(a2) at least one polyfunctional substituted aromatic amine (a2-s) having the general formula I

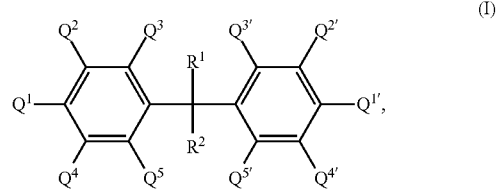

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, and $Q^2$, $Q^4$, $Q^{2'}$ and $Q^{4'}$ are selected so that the compound having the general formula I has at least one linear or branched alkyl group, which can bear further functional groups, having from 1 to 12 carbon atoms in the α position relative to at least one primary amino group bound to the aromatic ring, and optionally at least one further polyfunctional aromatic amine (a2-u) which differs from the amines (a2-s) having the general formula I and (a3) water in the presence of a solvent (C) and optionally in the presence of at least one catalyst (a4) to form the porous materials of the invention.

DETAILED DESCRIPTION OF THE PREFERRED EMBODIMENTS

Preferred embodiments may be found in the claims and the description. Combinations of preferred embodiments do not go outside the scope of the present invention. Preferred embodiments of the components used are described below.

The polyfunctional isocyanates (a1) will hereinafter be referred to collectively as component (a1). Analogously, the polyfunctional amines (a2) will hereinafter be referred to collectively as component (a2). It will be obvious to a person skilled in the art that the monomer components mentioned are present in reacted form in the porous material.

For the purposes of the present invention, the functionality of a compound is the number of reactive groups per molecule. In the case of the monomer component (a1), the functionality is the number of isocyanate groups per molecule. In the case of the amino groups of the monomer component (a2), the functionality is the number of reactive amino groups per molecule. A polyfunctional compound has a functionality of at least 2.

If mixtures of compounds having different functionalities are used as component (a1) or (a2), the functionality of the components is in each case given by the number average of the functionality of the individual compounds. A polyfunctional compound comprises at least two of the abovementioned functional groups per molecule.

Component (a1)

In the process of the invention, at least one polyfunctional isocyanate is reacted as component (a1).

In the process of the invention, the amount of component (a1) used is preferably from 40 to 99.8% by weight, in particular from 55 to 99.3% by weight, particularly preferably from 68 to 97.5% by weight, in each case based on the total weight of the components (a1), (a2) and (a3), which is 100% by weight.

Possible polyfunctional isocyanates are aromatic, aliphatic, cycloaliphatic and/or araliphatic isocyanates. Such polyfunctional isocyanates are known per se or can be prepared by methods known per se. The polyfunctional isocyanates can also be used, in particular, as mixtures, so that the component (a1) in this case comprises various polyfunctional isocyanates. Polyfunctional isocyanates which are possible as monomer building blocks (a1) have two (hereinafter referred to as diisocyanates) or more than two isocyanate groups per molecule of the monomer component.

Particularly suitable polyfunctional isocyanates are diphenylmethane 2,2'-,2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

As polyfunctional isocyanates (a1), preference is given to aromatic isocyanates. Particularly preferred polyfunctional isocyanates of the component (a1) are the following embodiments:

i) polyfunctional isocyanates based on tolylene diisocyanate (TDI), in particular 2,4-TDI or 2,6-TDI or mixtures of 2,4- and 2,6-TDI;

ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the production of MDI or mixtures of at least one oligomer of MDI and at least one of the abovementioned low molecular weight MDI derivatives;

iii) mixtures of at least one aromatic isocyanate according to embodiment i) and at least one aromatic isocyanate according to embodiment ii).

Oligomeric diphenylmethane diisocyanate is particularly preferred as polyfunctional isocyanate. Oligomeric diphenylmethane diisocyanate (hereinafter referred to as oligomeric MDI) is an oligomeric condensation product or a mixture of a plurality of oligomeric condensation products and thus a derivative/derivatives of diphenylmethane diisocyanate (MDI). The polyfunctional isocyanates can preferably also be made up of mixtures of monomeric aromatic diisocyanates and oligomeric MDI.

Oligomeric MDI comprises one or more condensation products of MDI which have a plurality of rings and a functionality of more than 2, in particular 3 or 4 or 5. Oligomeric MDI is known and is frequently referred to as polyphenylpolymethylene isocyanate or as polymeric MDI. Oligomeric MDI is usually made up of a mixture of MDI-based isocyanates having various functionalities. Oligomeric MDI is usually used in admixture with monomeric MDI.

The (average) functionality of an isocyanate comprising oligomeric MDI can vary in the range from about 2.2 to about 5, in particular from 2.4 to 3.5, in particular from 2.5 to 3. Such a mixture of MDI-based polyfunctional isocyanates having various functionalities is, in particular, crude MDI which is obtained in the production of MDI.

Polyfunctional isocyanates or mixtures of a plurality of polyfunctional isocyanates based on MDI are known and are marketed, for example, by BASF Polyurethanes GmbH under the name Lupranat®.

The functionality of the component (a1) is preferably at least two, in particular at least 2.2 and particularly preferably at least 2.5. The functionality of the component (a1) is preferably from 2.2 to 4 and particularly preferably from 2.5 to 3.

The content of isocyanate groups in the component (a1) is preferably from 5 to 10 mmol/g, in particular from 6 to 9 mmol/g, particularly preferably from 7 to 8.5 mmol/g. A person skilled in the art will know that the content of isocyanate groups in mmol/g and the equivalent weight in g/equivalent have a reciprocal relationship. The content of isocyanate groups in mmol/g can be derived from the content in % by weight in accordance with ASTM D-5155-96 A.

In a preferred embodiment, the component (a1) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, the component (a1) particularly preferably comprises oligomeric diphenylmethane diisocyanate and has a functionality of at least 2.5.

The viscosity of the component (a1) used can vary within a wide range. The component (a1) preferably has a viscosity of from 100 to 3000 mPa·s, particularly preferably from 200 to 2500 mPa·s.

Component (a2)

According to the invention, at least one polyfunctional substituted aromatic amine (a2-s) having the general formula I

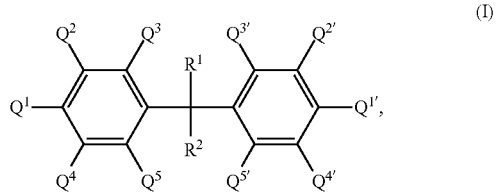

(I)

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, and $Q^2$, $Q^4$, $Q^{2'}$ and $Q^{4'}$ are selected so that the compound having the general formula I has at least one linear or branched alkyl group, which can optionally bear further functional groups, having from 1 to 12 carbon atoms in the α position relative to at least one primary amino group bound to the aromatic ring, and optionally at least one further polyfunctional aromatic amine (a2-u) which differs from the amines (a2-s) having the general formula I is/are reacted as component (a2).

Component (a2) thus comprises polyfunctional aromatic amines, with the polyfunctional aromatic amines (a2-s) having the general formula I being a constituent.

For the purposes of the present invention, polyfunctional amines are amines which have at least two amino groups which are reactive toward isocyanates per molecule. Here, primary and secondary amino groups are reactive toward isocyanates, with the reactivity of primary amino groups generally being significantly higher than that of secondary amino groups.

The amount of component (a2) used is preferably from 0.1 to 30% by weight, in particular from 0.5 to 20% by weight, particularly preferably from 2 to 12% by weight, in each case based on the total weight of the components (a1), (a2) and (a3), which is 100% by weight.

According to the invention, $R^1$ and $R^2$ in the general formula I are identical or different and are each selected independently from among hydrogen, a primary amino group and a linear or branched alkyl group having from 1 to 6 carbon atoms. $R^1$ and $R^2$ are preferably selected from among hydrogen and methyl. Particular preference is given to $R^1=R^2=H$.

$Q^2$, $Q^4$, $Q^{2'}$ and $Q^{4'}$ are preferably selected so that the substituted aromatic amine (a2-s) comprises at least two primary amino groups which each have one or two linear or branched alkyl groups having from 1 to 12 carbon atoms, which may bear further functional groups, in the α position. If one or more of $Q^2$, $Q^4$, $Q^{2'}$ and $Q^{4'}$ are selected so that they correspond to linear or branched alkyl groups which have from 1 to 12 carbon atoms and bear further functional groups, preference is given to amino groups and/or hydroxy groups and/or halogen atoms as such functional groups.

The alkyl groups as substituents Q in the general formula I are preferably selected from among methyl, ethyl, n-propyl, isopropyl, n-butyl, sec-butyl and tert-butyl.

The amines (a2-s) are preferably selected from the group consisting of 3,3',5,5'-tetraalkyl-4,4'-diaminodiphenylmethane, 3,3',5,5'-tetraalkyl-2,2'-diaminodiphenyl-methane and 3,3',5,5'-tetraalkyl-2,4'-diaminodiphenylmethane, where the alkyl groups in the 3,3',5 and 5' positions can be identical or different and are each selected independently from among linear or branched alkyl groups which have from 1 to 12 carbon atoms and can bear further functional groups. The abovementioned alkyl groups are preferably methyl, ethyl, n-propyl, i-propyl, n-butyl, sec-butyl or t-butyl (in each case unsubstituted).

In one embodiment, one, more than one or all hydrogen atoms of one or more alkyl groups of the substituents Q can have been replaced by halogen atoms, in particular chlorine. As an alternative, one, more than one or all hydrogen atoms of one or more alkyl groups of the substituents Q can have been replaced by $NH_2$ or OH. However, the alkyl groups in the general formula I are preferably made up of carbon and hydrogen.

In a particularly preferred embodiment, component (a2) comprises 3,3',5,5'-tetraalkyl-4,4'-diaminodiphenylmethane, where the alkyl groups can be identical or different and are each selected independently from among linear or branched alkyl groups which have from 1 to 12 carbon atoms and can optionally bear functional groups. The abovementioned alkyl groups are preferably selected from among unsubstituted alkyl groups, in particular methyl, ethyl, n-propyl, isopropyl, n-butyl, sec-butyl and tert-butyl, particularly preferably methyl and ethyl. Very particular preference is given to 3,3',5,5'-tetraethyl-4,4'-diaminodiphenylmethane and/or 3,3',5,5'-tetramethyl-4,4'-diaminodiphenylmethane.

The abovementioned polyfunctional amines of the type (a2-s) are known per se to those skilled in the art or can be prepared by known methods. One of the known methods is the reaction of aniline or derivatives of aniline with formaldehyde in the presence of an acid catalyst, in particular the reaction of 2,4- or 2,6-dialkylaniline.

The component (a2) can optionally also comprise further polyfunctional aromatic amines (a2-u) which differ from the amines of the structure (a2-s). The aromatic amines (a2-u) preferably have exclusively aromatically bound amino groups, but can also have both (cyclo)aliphatically and aromatically bound reactive amino groups.

Suitable polyfunctional aromatic amines (a2-u) are, in particular, isomers and derivatives of diaminodiphenylmethane. Isomers and derivatives of diaminodiphenylmethane which are preferred as constituents of component (a2) are, in particular, 4,4'-diaminodiphenylmethane, 2,4'-diaminodiphenylmethane, 2,2'-diaminodiphenylmethane and oligomeric diaminodiphenylmethane.

Further suitable polyfunctional aromatic amines (a2-u) are, in particular, isomers and derivatives of toluenediamine. Isomers and derivatives of toluenediamine which are preferred as constituents of component (a2) are, in particular, toluene-2,4-diamine and/or toluene-2,6-diamine and diethyltoluenediamines, in particular 3,5-diethyltoluene-2,4-diamine and/or 3,5-diethyltoluene-2,6-diamine.

In a first, particularly preferred embodiment, component (a2) consists exclusively of polyfunctional aromatic amines of the type (a2-s). In a second preferred embodiment, component (a2) comprises polyfunctional aromatic amines of the types (a2-s) and (a2-u). In the latter, second preferred embodiment, the component (a2) preferably comprises at least one polyfunctional aromatic amine (a2-u), of which at least one is selected from among isomers and derivatives of diaminodiphenylmethane (MDA).

In the second preferred embodiment, component (a2) correspondingly particularly preferably comprises at least one polyfunctional aromatic amine (a2-u) selected from among 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more methylene-bridged condensation products of aniline and formaldehyde having a plurality of rings. Oligomeric MDA comprises at least one oligomer, but in general a plurality of oligomers, of MDA having a functionality of more than 2, in particular 3 or 4 or 5. Oligomeric MDA is known or can be prepared by methods known per se. Oligomeric MDA is usually used in the form of mixtures with monomeric MDA.

The (average) functionality of a polyfunctional amine (a2-u) comprising oligomeric MDA can vary in the range from about 2.3 to about 5, in particular from 2.3 to 3.5 and in particular from 2.3 to 3. One such mixture of MDA-based polyfunctional amines having differing functionalities is, in particular, crude MDA which is formed, in particular, as intermediate in the condensation of aniline with formaldehyde, usually catalyzed by hydrochloric acid, in the production of crude MDI.

In the abovementioned preferred second embodiment, particular preference is given to the component (a2) comprising oligomeric diaminodiphenylmethane as compound (a2-u) and having an overall functionality of at least 2.1.

The proportion of amines of type (a2-s) having the general formula I based on the total weight of all polyfunctional amines of the component (a2), which thus add up to a total of 100% by weight, is preferably from 10 to 100% by weight, in particular from 30 to 100% by weight, very particularly preferably from 50 to 100% by weight, in particular from 80 to 100% by weight.

The proportion of polyfunctional aromatic amines (a2-u) which differ from the amines of type (a2-s) based on the total weight of all polyfunctional amines of the component (a2) is preferably from 0 to 90% by weight, in particular from 0 to 70% by weight, particularly preferably from 0 to 50% by weight, in particular from 0 to 20% by weight.

Component (a3) is water. The preferred amount of water used is from 0.1 to 30% by weight, in particular from 0.2 to 25% by weight, particularly preferably from 0.5 to 20% by weight, in each case based on the total weight of the components (a1), (a2) and (a3), which is 100% by weight.

The preferred amount of water within the ranges presented depends on whether a catalyst (a4) is or is not used.

In a first embodiment, the reaction of the components (a1), (a2) and (a3) is carried out in the absence of a catalyst (a4). In this first embodiment, it has been found to be advantageous to use from 5 to 30% by weight, in particular from 6 to 25% by weight, particularly preferably from 8 to 20% by weight, of water as component (a3), in each case based on the total weight of the components (a1), (a2) and (a3), which is 100% by weight.

In this first embodiment, the abovementioned components (a1), (a2) and (a3) are preferably used in the following ratio, in each case based on the total weight of the components (a1), (a2) and (a3), which is 100% by weight: from 40 to 94.9% by weight, in particular from 55 to 93.5% by weight, particularly preferably from 68 to 90% by weight, of the component (a1), from 0.1 to 30% by weight, in particular from 0.5 to 20% by weight, particularly preferably from 2 to 12% by weight, of the component (a2) and from 5 to 30% by weight, in particular from 6 to 25% by weight, particularly preferably from 8 to 20% by weight, of the component (a3).

A calculated content of amino groups can be derived from the water content and the content of reactive isocyanate groups of the component (a1) by assuming complete reaction of the water with the isocyanate groups of the component (a1) to form a corresponding number of amino groups and adding this content to the content resulting from component (a2) (total $n^{amine}$). The resulting use ratio of the calculated remaining NCO groups $n^{NCO}$ to the amino groups calculated to have been formed and used will hereinafter be referred to as calculated use ratio $n^{NCO}/n^{amine}$ and is an equivalence ratio, i.e. a molar ratio of the respective functional groups.

In the abovementioned first embodiment, the calculated use ratio (equivalence ratio) $n^{NCO}/n^{amine}$ can vary over a wide range and in particular be from 0.6 to 5. $n^{NCO}/n^{amine}$ is preferably from 1 to 1.6, in particular from 1.1 to 1.4.

Water reacts with the isocyanate groups to form amino groups and liberate $CO_2$. Polyfunctional amines are therefore partially produced as intermediate (in situ). In the further course of the reaction, they are reacted with isocyanate groups to form urea linkages. The production of amines as intermediate leads to porous materials having particularly high mechanical stability and low thermal conductivity. However, the $CO_2$ formed must not disrupt gelling to such an extent that the structure of the resulting porous material is influenced in an undesirable way. This gives the abovementioned preferred upper limit for the water content based on the total weight of the components (a1) to (a3), which is preferably not more than 30% by weight, particularly preferably not more than 25% by weight, in particular not more than 20% by weight. A water content in this range also leads to the advantage that any residual water after gelling is complete does not have to be removed in a complicated fashion by drying.

In a second, preferred embodiment, the reaction of the components (a1), (a2) and (a3) is carried out in the presence of a catalyst (a4). In this second embodiment, it has been found to be advantageous to use from 0.1 to 15% by weight, in particular from 0.2 to 15% by weight, particularly preferably from 0.5 to 12% by weight, of water as component (a3), in each case based on the total weight of the components (a1), (a2) and (a3), which is 100% by weight. In the abovementioned ranges, particularly advantageous mechanical properties of the resulting porous materials are obtained, which is due to a particularly advantageous network structure. A larger amount of water has an adverse effect on the network structure and is disadvantageous in terms of the final properties of the porous material.

In the preferred second embodiment, the abovementioned components (a1), (a2) and (a3) are preferably used in the following ratio, in each case based on the total weight of the components (a1), (a2) and (a3), which is 100% by weight: from 55 to 99.8% by weight, in particular from 65 to 99.3% by weight, particularly preferably from 76 to 97.5% by weight, of the component (a1), from 0.1 to 30% by weight, in particular from 0.5 to 20% by weight, particularly preferably from 2 to 12% by weight, of the component (a2) and from 0.1 to 15% by weight, in particular from 0.2 to 15% by weight, particularly preferably from 0.5 to 12% by weight, of the component (a3).

In the abovementioned second embodiment, the calculated use ratio (equivalence ratio) $n^{NCO}/n^{amine}$ is preferably from 1.01 to 5. The equivalence ratio mentioned is particularly preferably from 1.1 to 3, in particular from 1.1 to 2. An excess of $n^{NCO}$ over $n^{amine}$ leads, in this embodiment, to lower shrinkage of the porous material, in particular xerogel, in the removal of the solvent and as a result of synergistic interaction with the catalyst (a4) to an improved network structure and to improved final properties of the resulting porous material.

The components (a1) and (a2) will hereinafter be referred to collectively as organic gel precursor (A). It will be obvious to a person skilled in the art that the partial reaction of the component (a1) with the component (a3) leads to the actual gel precursor (A) which is subsequently converted into a gel.

Catalyst (a4)

The process of the invention is preferably carried out in the presence of at least one catalyst as component (a4).

Possible catalysts are in principle all catalysts known to those skilled in the art which accelerate the trimerization of isocyanates (known as trimerization catalysts) and/or the reaction of isocyanates with amino groups (known as gelling catalysts) and/or the reaction of isocyanates with water (known as blowing catalysts).

The corresponding catalysts are known per se and have different relative activities in respect of the abovementioned three reactions. Depending on the relative activity, they can thus be assigned to one or more of the abovementioned types. Furthermore, it will be known to a person skilled in the art that reactions other than those mentioned above can also occur.

Corresponding catalysts can be characterized, inter alia, according to their gelling to blowing ratio, as is known, for example, from Polyurethane, 3$^{rd}$ edition, G. Oertel, Hanser Verlag, Munich, 1993.

Preferred catalysts (a4) have a balanced gelling to blowing ratio, so that the reaction of the component (a1) with water is not too strongly accelerated, leading to an adverse effect on the network structure, and at the same time results in a short gelling time so that the demolding time is advantageously short. Preferred catalysts at the same time have a significant activity in respect of trimerization. This favorably influences the homogeneity of the network structure, resulting in particularly advantageous mechanical properties.

The catalysts can be able to be incorporated as a monomer building block (incorporatable catalyst) or not be able to be incorporated.

The component (a4) is advantageously used in the smallest effective amount. Preference is given to employing amounts of from 0.01 to 5 parts by weight, in particular from 0.1 to 3 parts by weight, particularly preferably from 0.2 to 2.5 parts by weight, of the component (a4) based on a total of 100 parts by weight of the components (a1), (a2) and (a3).

Catalysts preferred as component (a4) are selected from the group consisting of primary, secondary and tertiary amines, triazine derivatives, organic metal compounds, metal chelates, quaternary ammonium salts, ammonium hydroxides and also alkali metal and alkaline earth metal hydroxides, alkoxides and carboxylates.

Suitable catalysts are in particular strong bases, for example quaternary ammonium hydroxides such as tetraalkylammonium hydroxides having from 1 to 4 carbon atoms in the alkyl radical and benzyltrimethylammonium hydroxide, alkali metal hydroxides such as potassium or sodium hydroxide and alkali metal alkoxides such as sodium methoxide, potassium and sodium ethoxide and potassium isopropoxide.

Further suitable catalysts are, in particular, alkali metal salts of carboxylic acids, e.g. potassium formate, sodium acetate, potassium acetate, potassium 2-ethylhexanoate, potassium adipate and sodium benzoate, alkali metal salts of long-chain fatty acids having from 8 to 20 carbon atoms, in particular from 10 to 20 carbon atoms, and optionally lateral OH groups.

Further suitable catalysts are, in particular, N-hydroxyalkyl quaternary ammonium carboxylates, e.g. trimethylhydroxypropylammonium formate.

Organic metal compounds as, in particular, gelling catalysts are known per se to those skilled in the art and are likewise suitable as catalysts (a4). Organic tin compounds such as tin 2-ethylhexanoate and dibutyltin dilaurate are preferred as constituents of component (a4).

Tertiary amines are known per se to those skilled in the art as gelling catalysts and as trimerization catalysts. Tertiary amines are particularly preferred as catalysts (a4). Preferred tertiary amines are, in particular, N,N-dimethylbenzylamine, N,N'-dimethylpiperazine, N,N-dimethylcyclohexylamine, N,N',N''-tris(dialkylaminoalkyl)-s-hexahydrotriazines, such as N,N',N''-tris(dimethylaminopropyl)-s-hexahydrotriazine, tris(dimethylaminomethyl)phenol, bis(2-dimethylaminoethyl) ether, N,N,N,N,N-pentamethyldiethylenetriamine, methylimidazole, dimethylbenzylamine, 1,6-diazabicyclo[5.4.0]undec-7-ene, triethylamine, triethylenediamine (IUPAC: 1,4-diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine and diisopropanolamine.

Catalysts which are particularly preferred as component (a4) are selected from the group consisting of N,N-dimethylcyclohexylamine, bis(2-dimethylaminoethyl) ether, N,N,N,N,N-pentamethyldiethylenetriamine, methylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, metal acetylacetonates, ammonium ethylhexanoates and metal ethylhexanoates.

The use of the catalysts (a4) which are preferred for the purposes of the present invention leads to porous materials having improved mechanical properties, in particular improved compressive strength. In addition, the gelling time is reduced by use of the catalysts (a4), i.e. the gelling reaction is accelerated, without other properties being adversely affected.

Solvent (C)

According to the present invention, the reaction takes place in the presence of a solvent (C).

For the purposes of the present invention, the term solvent (C) comprises liquid diluents, i.e. both solvents in the narrower sense and also dispersion media. The mixture can, in particular, be a true solution, a colloidal solution or a dispersion, e.g. an emulsion or suspension. The mixture is preferably a true solution. The solvent (C) is a compound which is liquid under the conditions of step (a), preferably an organic solvent.

The solvent (C) can in principle be an organic compound or a mixture of a plurality of compounds, with the solvent (C) being liquid under the temperature and pressure conditions under which the mixture is provided in step (a) (dissolution conditions for short). The composition of the solvent (C) is selected so that it is able to dissolve or disperse, preferably dissolve, the organic gel precursor. Preferred solvents (C) are those which are a solvent for the organic gel precursor (A), i.e. ones which dissolve the organic gel precursor (A) completely under the reaction conditions.

The reaction product of the reaction in the presence of the solvent (C) is initially a gel, i.e. a viscoelastic chemical network which is swollen by the solvent (C). A solvent (C) which is a good swelling agent for the network formed in step (b) generally leads to a network having fine pores and a small average pore diameter, while a solvent (C) which is a poor swelling agent for the gel resulting from step (b) generally leads to a coarse-pored network having a large average pore diameter.

The choice of the solvent (C) thus influences the desired pore size distribution and the desired porosity. The choice of the solvent (C) is also generally made in such a way that precipitation or flocculation due to formation of a precipitated reaction product does not occur to a significant extent during or after step (b) of the process of the invention.

When a suitable solvent (C) is chosen, the proportion of precipitated reaction product is usually less than 1% by weight, based on the total weight of the mixture. The amount of precipitated product formed in a particular solvent (C) can be determined gravimetrically by filtering the reaction mixture through a suitable filter before the gelling point.

Possible solvents (C) are the solvents known from the prior art for isocyanate-based polymers. Preferred solvents are those which are a solvent for the components (a1), (a2) and (a3), i.e. solvents which dissolve the constituents of the components (a1), (a2) and (a3) virtually completely under the reaction conditions. The solvent (C) is preferably inert, i.e. unreactive, toward component (a1).

Possible solvents (C) are, for example, ketones, aldehydes, alkyl alkanoates, amides such as formamide and N-methylpyrrolidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible.

Further possibilities as solvent (C) are acetals, in particular diethoxymethane, dimethoxymethane and 1,3-dioxolane.

Dialkyl ethers and cyclic ethers are likewise suitable as solvents (C). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Further preferred solvents (C) are alkyl alkanoates, in particular methyl formate, methyl acetate, ethyl formate, butyl acetate and ethyl acetate. Preferred halogenated solvents are described in WO 00/24799, page 4, line 12 to page 5, line 4.

Aldehydes and/or ketones are particularly preferred as solvents (C). Aldehydes or ketones suitable as solvents (C) are, in particular, those corresponding to the general formula $R^2$—(CO)—$R^1$, where $R^1$ and $R^2$ are each hydrogen or an alkyl group having 1, 2, 3 or 4 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, methyl isobutyl ketone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone and acetophenone. The abovementioned aldehydes and ketones can also be used in the form of mixtures. Ketones and aldehydes having alkyl groups having up to 3 carbon atoms per substituent are preferred as solvents (C). Particular preference is given to acetone.

In many cases, particularly suitable solvents (C) are obtained by using two or more completely miscible compounds selected from the abovementioned solvents in the form of a mixture.

To obtain a sufficiently stable gel which does not shrink too much during drying in step (c) in step (b), the proportion of the components (a1), (a2) and (a3) based on the total weight of the components (a1) to (a3) and the solvent (C), which is 100% by weight, must generally be not less than 5% by weight. The proportion of the components (a1), (a2) and (a3) based on the total weight of the components (a1) to (a3) and the solvent (C), which is 100% by weight, is preferably at least 6% by weight, particularly preferably at least 8% by weight, in particular at least 10% by weight.

On the other hand, the concentration of the components (a1) to (a3) in the mixture provided must not be too high since otherwise no porous material having favorable properties is obtained. In general, the proportion of the components (a1), (a2) and (a3) based on the total weight of the components (a1) to (a3) and the solvent (C), which is 100% by weight, is not more than 40% by weight. The proportion of the components (a1), (a2) and (a3) based on the total weight of the components (a1) to (a3) and the solvent (C), which is 100% by weight, is preferably not more than 35% by weight, particularly preferably not more than 25% by weight, in particular not more than 20% by weight.

The total proportion by weight of the components (a1), (a2) and (a3) based on the total weight of the components (a1), (a2) and (a3) and the solvent (S), which is 100% by weight, is preferably from 8 to 25% by weight, in particular from 10 to 20% by weight, particularly preferably from 12 to 18% by weight. Adherence to the amount of the starting materials in the range mentioned leads to porous materials having a particularly advantageous pore structure, low thermal conductivity and low shrinking during drying.

Before the reaction, it is necessary to mix the components used, in particular to mix them homogeneously. The rate of mixing should be high relative to the rate of the reaction in order to avoid mixing defects. Appropriate mixing methods are known per se to those skilled in the art.

Preferred process for producing the porous materials

In a preferred embodiment, the process of the invention comprises at least the following steps:
(a) provision of the components (a1), (a2) and (a3) and the solvent (C) as described above,
(b) reaction of the components (a1), (a2) and (a3) in the presence of the solvent (C) to form a gel and
(c) drying of the gel obtained in the preceding step.

Preferred embodiments of steps (a) to (c) will be described in detail below.

Step (a)

According to the invention, the components (a1), (a2) and (a3) and the solvent (C) are provided in step (a).

The components (a1) and (a2) are preferably provided separately from one another, each in a suitable partial amount of the solvent (C). The separate provision makes it possible for the gelling reaction to be optimally monitored or controlled before and during mixing.

Component (a3) is particularly preferably provided as a mixture with component (a2), i.e. separately from component (a1). This avoids the reaction of water with component (a1) to form networks without the presence of component (a2). The prior mixing of water with component (a1) otherwise leads to less favorable properties in respect of the homogeneity of the pore structure and the thermal conductivity of the resulting materials.

The mixture or mixtures provided in step (a) can also comprise customary auxiliaries known to those skilled in the art as further constituents. Mention may be made by way of example of surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and biocides.

Further information regarding the abovementioned auxiliaries and additives may be found in the specialist literature, e.g. in Plastics Additive Handbook, 5th edition, H. Zweifel, ed. Hanser Publishers, Munich, 2001.

Step (b)

According to the invention, the reaction of the components (a1) and (a2) takes place in the presence of the solvent (C) to form a gel in step (b). Thus, in step (b) of the process of the invention, the component (a1) is partly reacted with water to form at least one polyfunctional amine and the polyfunctional amines are reacted with the polyfunctional isocyanates in a gelling reaction to form a gel.

To carry out the reaction, a homogeneous mixture of the components provided in step (a) firstly has to be produced.

The provision of the components provided in step (a) can be carried out in a conventional way. A stirrer or another mixing device is preferably used here in order to achieve good and rapid mixing. The time required for producing the homogeneous mixture should be short in relation to the time during which the gelling reaction leads to at least partial formation of a gel, in order to avoid mixing defects. The other mixing conditions are generally not critical; for example, mixing can be carried out at from 0 to 100° C. and from 0.1 to 10 bar (absolute), in particular at, for example, room temperature and atmospheric pressure. After a homogeneous mixture has been produced, the mixing apparatus is preferably switched off.

The gelling reaction is a polyaddition reaction, in particular a polyaddition of isocyanate groups and amino groups.

For the purposes of the present invention, a gel is a crosslinked system based on a polymer which is present in contact with a liquid (known as Solvogel or Lyogel, or with water as liquid: aquagel or hydrogel). Here, the polymer phase forms a continuous three-dimensional network.

In step (b) of the process of the invention, the gel is usually formed by allowing to rest, e.g. by simply allowing the container, reaction vessel or reactor in which the mixture is present (hereinafter referred to as gelling apparatus) to stand. The mixture is preferably no longer stirred or mixed during gelling (gel formation) because this could hinder formation of the gel. It has been found to be advantageous to cover the mixture during gelling or to close the gelling apparatus.

Gelling is known per se to a person skilled in the art and is described, for example, in WO-2009/027310 on page 21, line 19 to page 23, line 13, the contents of which are hereby fully incorporated by reference.

Step (c)

According to the invention, the gel obtained in the previous step is dried in step (c).

Drying under supercritical conditions is in principle possible, preferably after replacement of the solvent by $CO_2$ or other solvents suitable for the purposes of supercritical drying. Such drying is known per se to a person skilled in the art. Supercritical conditions characterize a temperature and a pressure at which the fluid phase to be removed is present in the supercritical state. In this way, shrinkage of the gel body on removal of the solvent can be reduced.

However, in view of the simple process conditions, preference is given to drying the gels obtained by conversion of the liquid comprised in the gel into the gaseous state at a temperature and a pressure below the critical temperature and the critical pressure of the liquid comprised in the gel.

The drying of the gel obtained is preferably carried out by converting the solvent (C) into the gaseous state at a temperature and a pressure below the critical temperature and the critical pressure of the solvent (C). Accordingly, drying is preferably carried out by removing the solvent (C) which was present in the reaction without prior replacement by a further solvent.

Such methods are likewise known to those skilled in the art and are described in WO-2009/027310 on page 26, line 22 to page 28, line 36, the contents of which are hereby fully incorporated by reference.

Properties of the Porous Materials and Use

The present invention further provides the porous materials which can be obtained by the process of the invention.

Xerogels are preferred as porous materials for the purposes of the present invention, i.e. the porous material which can be obtained according to the invention is preferably a xerogel.

For the purposes of the present invention, a xerogel is a porous material which has a porosity of at least 70% by volume and a volume average pore diameter of not more than 50 microns and has been produced by a sol-gel process, with the liquid phase having been removed from the gel by drying below the critical temperature and below the critical pressure of the liquid phase ("subcritical conditions").

The average pore diameter is determined by scanning electron microscopy and subsequent image analysis using a statistically significant number of pores. Corresponding methods are known to those skilled in the art.

The volume average pore diameter of the porous material is preferably not more than 5 microns. The volume average pore diameter of the porous material is particularly preferably not more than 4 microns, very particularly preferably not more than 3 microns and in particular not more than 2.5 microns.

Although a very small pore size combined with a high porosity is desirable from the point of view of a low thermal conductivity, from the point of view of production and to obtain a sufficiently mechanically stable porous material, there is a practical lower limit to the volume average pore diameter. In general, the volume average pore diameter is at least 200 nm, preferably at least 400 nm. In many cases, the volume average pore diameter is at least 500 nm, in particular at least 1 micron.

The porous material which can be obtained according to the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the specified proportion of the total volume of the porous material comprises pores. Although a very high porosity is usually desirable from the point of view of a minimal thermal conductivity, an upper limit is imposed on the porosity by the mechanical properties and the processability of the porous material.

The components (a1), sometimes firstly reacted with water, and (a2) are present in reactive (polymer) form in the porous material which can be obtained according to the invention. Owing to the composition according to the invention, the monomer building blocks (a1) and (a2) are predominantly bound via urea linkages and/or via isocyanurate linkages in the porous material, with the isocyanurate groups being formed by trimerization of isocyanate groups of the monomer building blocks (a1). If the porous material comprises further components, further possible linkages are, for example, urethane groups formed by reaction of isocyanate groups with alcohols or phenols.

The components (a1), sometimes firstly reacted with water, and (a2) are preferably linked to an extent of at least 50 mol% by urea groups —NH—CO—NH— and/or via isocyanurate linkages in the porous material. The components (a1) and (a2) are preferably linked to an extent of from 50 to 100 mol % by urea groups and/or via isocyanurate linkages in the porous material, in particular from 60 to 100 mol %, very particularly preferably from 70 to 100 mol %, in particular from 80 to 100 mol %, for example from 90 to 100 mol %.

The balance to 100 mol % are present as further linkages, with such further linkages being known per se to a person skilled in the art from the field of isocyanate polymers. Examples which may be mentioned are ester, urea, biuret, allophanate, carbodiimide, isocyanurate, uretdione and/or urethane groups.

The determination of the mol% of the linkages of the monomer building blocks in the porous material is carried out by means of NMR spectroscopy (nuclear magnetic resonance) in the solid or in the swollen state. Suitable methods of determination are known to those skilled in the art.

The density of the porous material which can be obtained according to the invention is usually from 20 to 600 g/l, preferably from 50 to 500 g/l and particularly preferably from 70 to 200 g/l.

The process of the invention gives a coherent porous material and not only a polymer powder or particles. Here, the three-dimensional shape of the resulting porous material is determined by the shape of the gel which is in turn determined by the shape of the gelling apparatus. Thus, for example, a cylindrical gelling vessel usually gives an approximately cylindrical gel which can then be dried to give a porous material having a cylindrical shape.

The porous materials which can be obtained according to the invention have a low thermal conductivity, a high porosity and a low density combined with high mechanical stability. In addition, the porous materials have a small average pore size. The combination of the abovementioned properties allows the materials to be used as insulation material in the field of thermal insulation, in particular for applications in the vacuum sector where a very low thickness of vacuum panels is preferred, for example in refrigeration appliances or in buildings. Thus, the use in vacuum insulation panels, in particular as core material for vacuum insulation panels, is preferred. In addition, use of the porous materials of the invention as insulation material is preferred.

Furthermore, uses at pressures of from 1 to 100 mbar and in particular from 10 to 100 mbar are possible because of the low thermal conductivity of the porous materials which can be obtained according to the invention. The property profile of the porous materials which can be obtained according to the invention opens up, in particular, uses in which a long life of the vacuum panels is desired and in which the thermal conductivity remains low after many years even in the even of a pressure increase of about 2 mbar per year, for example at a pressure of 100 mbar. The porous materials which can be obtained according to the invention have advantageous thermal properties and also advantageous materials properties such as simple processability and high mechanical stability, for example low brittleness.

EXAMPLES

The thermal conductivity λ was determined in accordance with DIN EN 12667 using a plate instrument from Hesto (Lambda Control A50).

The following compounds were used:
Component a1:
  Oligomeric MDI (Lupranat® M200) having an NCO content of 30.9 g per 100 g in accordance with ASTM D-5155-96 A, a functionality in the region of three and a viscosity of 2100 mPa·s at 25° C. in accordance with DIN 53018 (hereinafter "compound M200").
  Oligomeric MDI (Lupranat® M50) having an NCO content of 31.5 g per 100 g in accordance with ASTM D-5155-96 A, a functionality in the range from 2.8 to 2.9 and a viscosity of 550 mPa·s at 25° C. in accordance with DIN 53018 (hereinafter "compound M50").
Component a2:
  3,3',5,5'-Tetraethyl-4,4'-diaminodiphenylmethane (hereinafter "MDEA"); 3,3',5,5'-tetramethyl-4,4'-diaminodiphenylmethane (hereinafter "MDMA").
Component a2 (for Comparative Examples):
  Ethacure® 100 from Albemarle, a mixture of aromatic diamines, comprising in particular 3,5-diethyltoluene-2,4-diamine and 3,5-diethyltoluene-2,6-diamine; Unilink® 4200 from UOP, an aromatic diamine having the structure 4,4'-bis(sec-butylamino)diphenylmethane;
  3,3',5,5'-tetramethyl-4,4'-diaminodicyclohexylmethane; 4,4'-diaminodiphenylmethane.
Catalysts (a4):
  Triethanolamine; triethylenediamine (IUPAC: 1,4-diazabicyclo[2.2.2]octane); N,N-dimethylcyclohexylamine.

Example 1

56 g of the compound M50 were dissolved while stirring at 20° C. in 210 g of acetone in a glass beaker. 4 g of the compound MDEA and 8 g of water were dissolved in 210 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

Scanning electron microscopy with subsequent image analysis indicated a bimodal pore size distribution having pore diameters in the region of 15 μm and 800 nm. The thermal conductivity was 2.9 mW/m*K at a pressure of $2.2*10^{-1}$ mbar.

Example 2

60 g of the compound M200 were dissolved while stirring at 20° C. in 210 g of acetone in a glass beaker. 8 g of the compound MDEA and 8 g of water were dissolved in 210 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days. Electron micrographs indicated an average pore diameter of about 1 μm.

The thermal conductivity was 5.5 mW/m*K at a pressure of 2.3*10⁻⁴ mbar.

Example 3

70 g of the compound M50 were dissolved while stirring at 20° C. in 210 g of acetone in a glass beaker. 4 g of the compound MDEA, 2 g of triethanolamine and 8 g of water were dissolved in 210 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

Electron micrographs indicated a bimodal pore size distribution having pores in the region of 15 μm and 800 nm.

The thermal conductivity was 7.1 mW/m*K at a pressure of 2.3*10⁻⁴ mbar. The use of the catalyst led to a reduced gelling time and to improved compressive strength compared to a procedure without catalyst.

Example 4

56 g of the compound M50 were dissolved while stirring at 20° C. in 210 g of acetone in a glass beaker. 4 g of the compound MDEA, 0.5 g of triethylenediamine and 8 g of water were dissolved in 210 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

Electron micrographs indicated an average pore diameter of about 1.5 μm.

The thermal conductivity was 4.3 mW/m*K at a pressure of 2.2*10⁻⁴ mbar. The use of the catalyst led to a reduced gelling time and to improved compressive strength compared to a procedure without catalyst.

Example 5

70 g of the compound M50 were dissolved while stirring at 20° C. in 210 g of acetone in a glass beaker. 4 g of the compound MDEA, 2 g of N,N-dimethylcyclohexylamine and 8 g of water were dissolved in 210 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

Electron micrographs indicated an average pore diameter of about 800 nm.

The thermal conductivity was 7.2 mW/m*K at a pressure of 2.7*10⁻⁴ mbar. The use of the catalyst led to a reduced gelling time and to improved compressive strength compared to a procedure without catalyst.

Comparative Example 6

3 g of the compound M200 were dissolved while stirring at 20° C. in 10.5 g of acetone in a glass beaker. 0.1 g of the compound Ethacure® 100 and 0.5 g of water were dissolved in 11 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

No stable gel could be produced since only a precipitate was formed.

Comparative Example 7

3 g of the compound M200 were dissolved while stirring at 20° C. in 10.5 g of acetone in a glass beaker. 0.1 g of the compound Unilink® 4200 and 0.5 g of water were dissolved in 11 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

No stable gel could be produced since only a precipitate was formed.

Comparative Example 8

3 g of the compound M200 were dissolved while stirring at 20° C. in 10.5 g of acetone in a glass beaker. 0.1 g of the compound 3,3',5,5'-tetramethyl-4,4'-diaminodicyclohexylmethane and 0.5 g of water were dissolved in 11 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

No stable gel could be produced since only a precipitate was formed.

Comparative Example 9

3 g of the compound M200 were dissolved while stirring at 20° C. in 10.5 g of acetone in a glass beaker. 0.1 g of the compound 4,4'-diaminodiphenylmethane and 0.5 g of water were dissolved in 11 g of acetone in a second glass beaker. The two solutions from step (a) were mixed with stirring. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

No stable gel could be produced since only a precipitate was formed.

The invention claimed is:

1. A process for producing a porous material, which comprises reacting the following components:
   (a1) at least one polyfunctional isocyanate, and
   (a2) at least one polyfunctional substituted aromatic amine (a2-s) having the general formula I

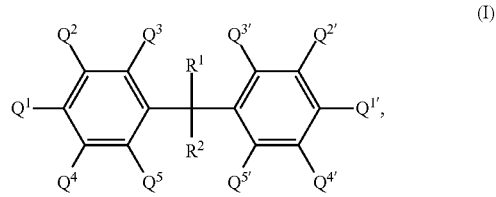

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group, and $Q^2$, $Q^4$, $Q^{2'}$ and $Q^{4'}$ are selected so that the compound having the general formula I has at least one linear or branched alkyl group, which can bear further functional groups, having from 1 to 12 carbon atoms in the α position relative to at least one primary amino group bound to the aromatic ring, and optionally at least one further polyfunctional aromatic amine (a2-u) which differs from the amines (a2-s) having the general formula I and (a3) water in the presence of a solvent (C) and optionally in the presence of at least one catalyst (a4);

wherein a total amount of the component (a1), the component (a2) and the water account for no more than 40% by weight in the solvent, based on the total weight of the components (a1) and (a2), the water and the solvent.

2. The process according to claim 1, wherein $Q^2$, $Q^4$, $Q^{2'}$ and $Q^{4'}$ are selected so that the substituted aromatic amine (a2-s) comprises at least two primary amino groups which each have a linear or branched alkyl group having from 1 to 12 carbon atoms, which can bear further functional groups, in the α position.

3. The process according to claim 1, wherein the amine component (a2) comprises at least one compound (a2-s) selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are selected independently from among linear or branched alkyl groups which have from 1 to 12 carbon atoms and can bear further functional groups.

4. The process according to claim 1, wherein the alkyl groups of the polyfunctional aromatic amines (a2-s) having the general formula I are selected from among methyl, ethyl, n-propyl, isopropyl, n-butyl, sec-butyl and tert-butyl.

5. The process according to claim 1, wherein the polyfunctional aromatic amines (a2-s) having the general formula 1 are 3,3',5,5'-tetraalkyl-4,4'-diaminodiphenylmethanes, preferably 3,3',5,5'-tetraethyl-4,4'-diaminodiphenylmethane and/or 3,3',5,5'-tetramethyl-4,4'-diaminodiphenylmethane.

6. The process according to claim 1, wherein the amount of component (a1) used is from 40 to 99.8% by weight based on the total weight of the components (a1), (a2) and (a3), which is 100% by weight.

7. The process according to claim 1, wherein the amount of component (a2) used is from 0.1 to 30% by weight, that of the component (a1) is from 40 to 99.8% by weight and that of the component (a3) is from 0.1 to 30% by weight, in each case based on the total weight of the components (a1), (a2) and (a3), which is 100% by weight.

8. The process according to claim 1, wherein component (a2) consists exclusively of compounds of the type (a2-s) having the general formula 1.

9. The process according to claim 1, wherein the reaction is carried out in the presence of a catalyst (a4).

10. The process according to claim 1, wherein the reaction is carried out in the presence of at least one tertiary amine as catalyst (a4).

11. The process according to claim 1, which comprises:
a) provision of the components (a1), (a2) and (a3) and the solvent (C),
b) reaction of the components (a1), (a2) and (a3) in the presence of the solvent (C) to form a gel and
c) drying of the gel obtained in the preceding step.

12. The process according to claim 11, wherein the components (a1) and (a2) are provided separately, in each case in a partial amount of the solvent (C).

13. The process according to claim 11, wherein the drying of the gel obtained is carried out by converting the liquid comprised in the gel into the gaseous state at a temperature and a pressure below the critical temperature and the critical pressure of the liquid comprised in the gel.

14. The process according to claim 11, wherein the drying of the gel obtained is carried out under supercritical conditions.

15. The process according to claim 1, wherein the amount of component (a1) used is from 55 to 99.3% by weight, based on the total weight of the components (a1), (a2) and (a3), which is 100% by weight.

16. A process for producing a porous material, which comprises reacting component (a1) with component (a2) in the presence of water and a solvent to provide an organic gel, wherein the solvent is a liquid under the temperature and pressure conditions of a reaction of the components (a1) and (a2), and which can dissolve the organic gel, or provide a dispersion of the organic gel, the component (a1) is at least one polyfunctional isocyanate, and the component (a2) is at least one polyfunctional substituted aromatic amine (a2-s) having the general formula I

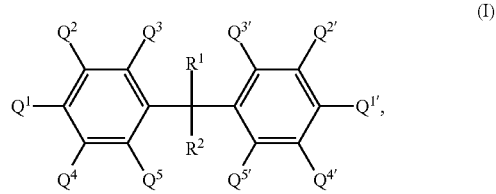

where $R^1$ and $R^2$ can be identical or different and are each selected independently from among hydrogen and linear or branched alkyl groups having from 1 to 6 carbon atoms and all substituents $Q^1$ to $Q^5$ and $Q^{1'}$ to $Q^{5'}$ are identical or different and are each selected independently from among hydrogen, a primary amino group and a linear or branched alkyl group having from 1 to 12 carbon atoms, where the alkyl group can bear further functional groups, with the proviso that the compound having the general formula I comprises at least two primary amino groups, where at least one of $Q^1$, $Q^3$ and $Q^5$ is a primary amino group and at least one of $Q^{3'}$ and $Q^{5'}$ is a primary amino group, and $Q^2$, $Q^4$, $Q^{2'}$ and $Q^{4'}$ are selected so that the compound having the general formula I has at least one linear or branched alkyl group, which can bear further functional groups, having from 1 to 12 carbon atoms in the αposition relative to at least one primary amino group bound to the aromatic ring, and optionally at least one further polyfunctional aromatic amine (a2-u) which differs from the amines (a2-s);

wherein a total amount of the component (a1), the component (a2) and the water account for no more than 40% by weight in the solvent, based on the total weight of the components (a1) and (a2), the water and the solvent; and drying the organic gel to provide the porous material.

17. The process according to claim 16 wherein the total amount of the component (a1), the component (a2) and the water account for 10% to 20% by weight in the solvent, to provide the porous material having a desired pore structure, low thermal conductivity and low shrinking upon drying.

\* \* \* \* \*